United States Patent [19]
Burton et al.

[11] 3,896,353

[45] July 22, 1975

[54] ENCLOSED HIGH VOLTAGE MOTOR CONTROL WITH INTERLOCKING ELEMENTS

[75] Inventors: Lawrence A. Burton, Oconomowoc; Gustav W. Doos, Shorewood, both of Wis.

[73] Assignee: Allen-Bradley Company, Milwaukee, Wis.

[22] Filed: Jan. 14, 1974

[21] Appl. No.: 433,350

[52] U.S. Cl. .............................. 317/103; 200/50 AA
[51] Int. Cl. ........................................... H02b 11/14
[58] Field of Search ........... 200/50 AA, 50 R, 50 A; 317/103, 114, 120, 112

[56] References Cited
UNITED STATES PATENTS

| | | | |
|---|---|---|---|
| 2,658,170 | 11/1953 | Caswell | 200/50 AA |
| 3,283,215 | 11/1966 | Lohmeyer | 317/114 |
| 3,354,356 | 11/1967 | Pettit | 317/114 |
| 3,614,350 | 10/1971 | Eichelberger | 317/103 |
| 3,621,339 | 11/1971 | Hodgson | 317/103 |
| 3,796,922 | 3/1974 | Mrenna | 317/120 |

*Primary Examiner*—Gerald P. Tolin
*Attorney, Agent, or Firm*—Quarles & Brady

[57] ABSTRACT

A high voltage motor control enclosure includes three compartments into which electromagnetically actuated contactors are inserted. Each contactor is mounted to a carriage which slides into the enclosure and connects with a set of fuses mounted in an assembly on the back wall. Disconnect switches are mounted above the fuse assembly and connects the fuses with a source of high voltage located on the back of the enclosure. The disconnect switches are linked to the enclosure door handle by an interlock mechanism which opens the disconnect before the enclosure can be entered. The interlock mechanism is also coupled through a locking mechanism to the contactor to prevent the disconnect switches from being opened when the contactor is energized. A bi-directional motor control is described in which two contactors are coupled through the locking mechanism to the interlock.

9 Claims, 9 Drawing Figures

PATENTED JUL 22 1975 3,896,353

SHEET 1

ENCLOSED HIGH VOLTAGE MOTOR CONTROL WITH INTERLOCKING ELEMENTS

BACKGROUND OF THE INVENTION

The field of the invention is electric switches for interrupting large currents at high voltages, and more particularly, to the enclosures for such switches when used in combination with other elements to form a motor control, or motor starter.

As illustrated in U.S. Pat. No. 3,403,239 issued to Schramm et al. on Sept. 24, 1968, high voltage motor control switches are commonly mounted on a carriage which can be withdrawn from the cabinet for maintenance and repair. Also mounted on the carriage is an arc extinguishing apparatus including one or more arc chutes. Current limiting fuses are connected in series with the switch contacts and it is common practice to mount these fuses on the carriage as well.

As illustrated in U.S. Pat. No. 3,621,339 issued to Hodgson on Nov. 16, 1971, the carriage unit slides into the enclosure where it connects with a source of high voltage and to the load lines. Before the carriage unit is removed, however, it is desirable to isolate the high voltage from the interior of the enclosure. This is accomplished in present commercially available motor controls by a draw out mechanism which slides the carriage forward a few inches to disconnect it from the source of high voltage before the enclosure door is opened. A shutter mechanism is then operated to isolate the high voltage terminals. Due to the size and weight of the carriages, such draw out mechanisms are complex and expensive.

SUMMARY OF THE INVENTION

The present invention relates to an improved high voltage motor control which is particularly easy to service and maintain. The improved control includes a contactor which is mounted to a carriage that slides into an enclosure where it connects with a set of input terminals and a set of output terminals. A fuse assembly mounts along the back wall of the enclosure and connects between the input terminals and a disconnect assembly which is mounted above the fuse assembly. The disconnect assembly operates between a closed position in which it connects the fuses with a set of high voltage terminals on the back side of the enclosure and an opened position in which a shutter isolates the high voltage terminals from the interior of the enclosure. An interlock connects the disconnect assembly with a handle mounted on the front of the enclosure to insure that the high voltage terminals are disconnected and isolated before the enclosure door is opened.

A general object of the invention is to improve the serviceability of a high voltage motor control. The ease with which the carriage containing the contactor can be removed from the enclosure is significantly enhanced by reducing its size and weight. This is accomplished in part by removing the fuse assembly from the carriage and mounting it to the back wall of the cabinet. In addition, by providing a separate disconnect on the back wall of the enclosure, the complex draw out mechanism previously required on the carriage is eliminated.

Another general object of the invention is to provide an improved means for isolating the high voltage from the interior of the enclosure when the door is opened. Although the interlock insures that the disconnect is open before the handle can be operated to open the enclosure door, the disconnect is located above the carriage unit where it can be viewed through a window in the enclosure door. The disconnect includes knife switches which extend through openings in the back wall of the enclosure when closed. When opened, the knife switches withdraw into the enclosure and a shutter covers the openings to isolate the high voltage. This operation can be observed through the cabinet door window to provide added assurance that the high voltage source is properly isolated.

A more specific object of the invention is to prevent the disconnect from being opened when the contactor is energized. This is accomplished by a locking mechanism which is mounted on the floor of the enclosure and which is positioned for operation by the contactor. The locking mechanism is coupled to the interlock through a contactor rod, and when the contactor is energized the locking mechanism is operated to inhibit the operation of the interconnect.

Another general object of the invention is to facilitate the building of multi-contactor controls, and particularly, a control which includes a second contactor on a carriage unit in an enclosure compartment located either above or below the main compartment. For example, the contactor in the main compartment may drive a motor in the forward direction and a second contactor in a compartment below may drive the motor in the reverse direction. By mounting the fuse assembly on the back wall of the main enclosure compartment, the connection of the second contactor to the fuses is greatly facilitated. In addition, a second locking mechanism may be connected to the first locking mechanism through a set of contactor rods to inhibit the operation of the interconnect mechanism when either of the two contactors is energized. In addition, the locking mechanisms and associated contactor rods prevent both contactors from being energized simultaneously.

The foregoing and other objects and advantages of the invention will appear from the following description. In the description reference is made to the accompanying drawings which form a part hereof, and in which there is shown by way of illustration a preferred embodiment of the invention. Such embodiment does not necessarily represent the full scope of the invention, however, and reference is therefore made to the claims for interpreting the scope of the present invention.

DESCRIPTION OF THE PREFERRED EMBODIMENT

Figure 1:
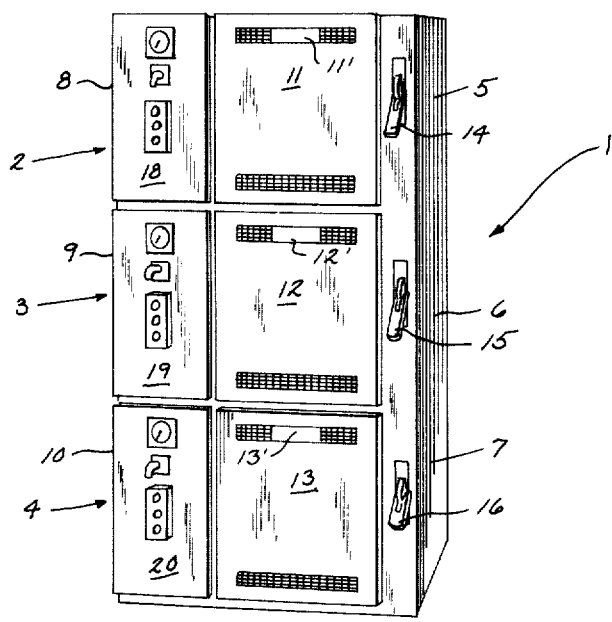
FIG. 1 is a perspective view of the invented motor control enclosure.

As shown in FIG. 1, a steel enclosure 1 is divided into three sections 2, 3 and 4 which are stacked one on top of the other. Each of the respective sections 2, 3 and 4 includes a relatively large contactor compartment 5, 6 and 7 and a control compartment 8, 9 and 10. Each of the respective contactor compartments 5, 6 and 7 includes a door 11, 12 and 13 which may be swung open when an associated handle 14, 15 and 16 is operated. Windows 11', 12' and 13' are formed in the doors 11, 12 and 13 and are covered with a transparent insulating material. Each control compartment 8, 9 and 10 houses the low voltage circuitry for controlling the operation of the contactors and the push button switches and indicator gauges associated with this circuitry are mounted on doors 18, 19 and 20.

The enclosure 1 may contain up to three separate high voltage contactors, one in each of the compartments 5, 6 and 7. As is well known in the art, each contactor may be connected to operate an associated motor, two contactors may be connected to operate a single bi-directional motor, or a third contactor may be connected to a single motor to provide dynamic breaking. It is a feature of the present invention that the enclosure 1 may be easily adapted to provide these various alternative motor control configurations. In the description which follows, the middle contactor compartment 6 will be described in detail and is shown interconnected with the lower compartment 7 to provide a bi-directional motor control. It should be understood, however, that the structure contained within each compartment 5, 6 and 7 is entirely interchangeable and the motor controls contained therein may operate separately or in combination with the controls in the other compartments.

Figure 2:
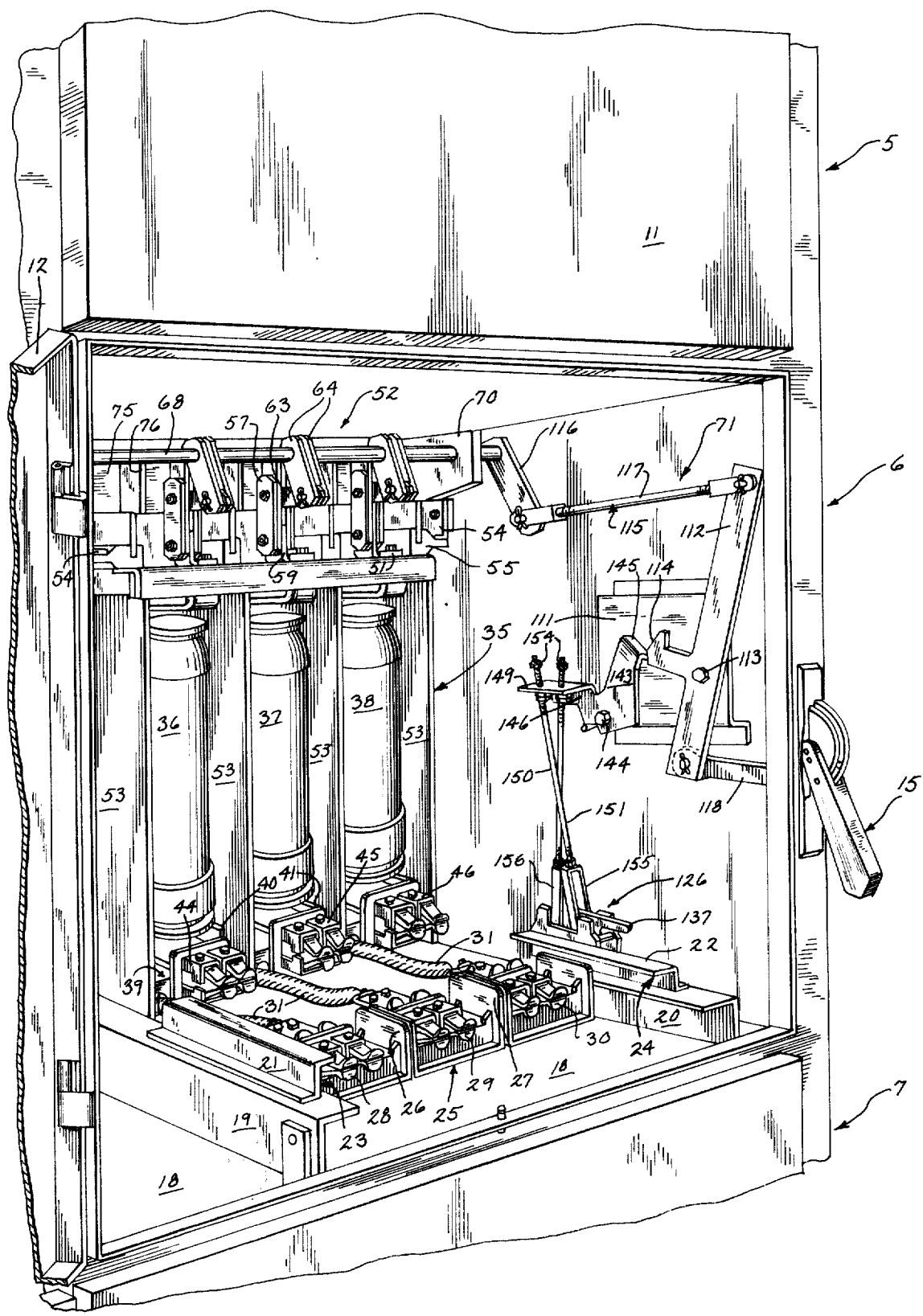
FIG. 2 is a perspective view of the center compartment of the enclosure with the carriage unit removed.

Referring to FIG. 2, the compartment 6 includes a floor 18 upon which a pair of spaced support brackets 19 and 20 are firmly fastened. A pair of guide rails 21 and 22 are mounted to the top surfaces of the respective support brackets 19 and 20 to form a pair of parallel guideways 23 and 24 which face one another and which extend from the front of the compartment towards the rear. Mounted to the floor 18 between the support brackets 19 and 20 is an output terminal support strip 25 which is molded from a glass polyester insulating material such as that sold by the Rostone Corporation under the trademark Rosite 3550C. The support strip 25 is divided into three sections by insulating walls 26 and 27 and three output terminal assemblies 28, 29 and 30 are mounted thereon. The output terminal assemblies 28, 29 and 30 each connect to one of three output cables 31 which extend along the floor 18 to the rear of the compartment and hence to a current transformer (not shown in the drawings).

Figure 3:
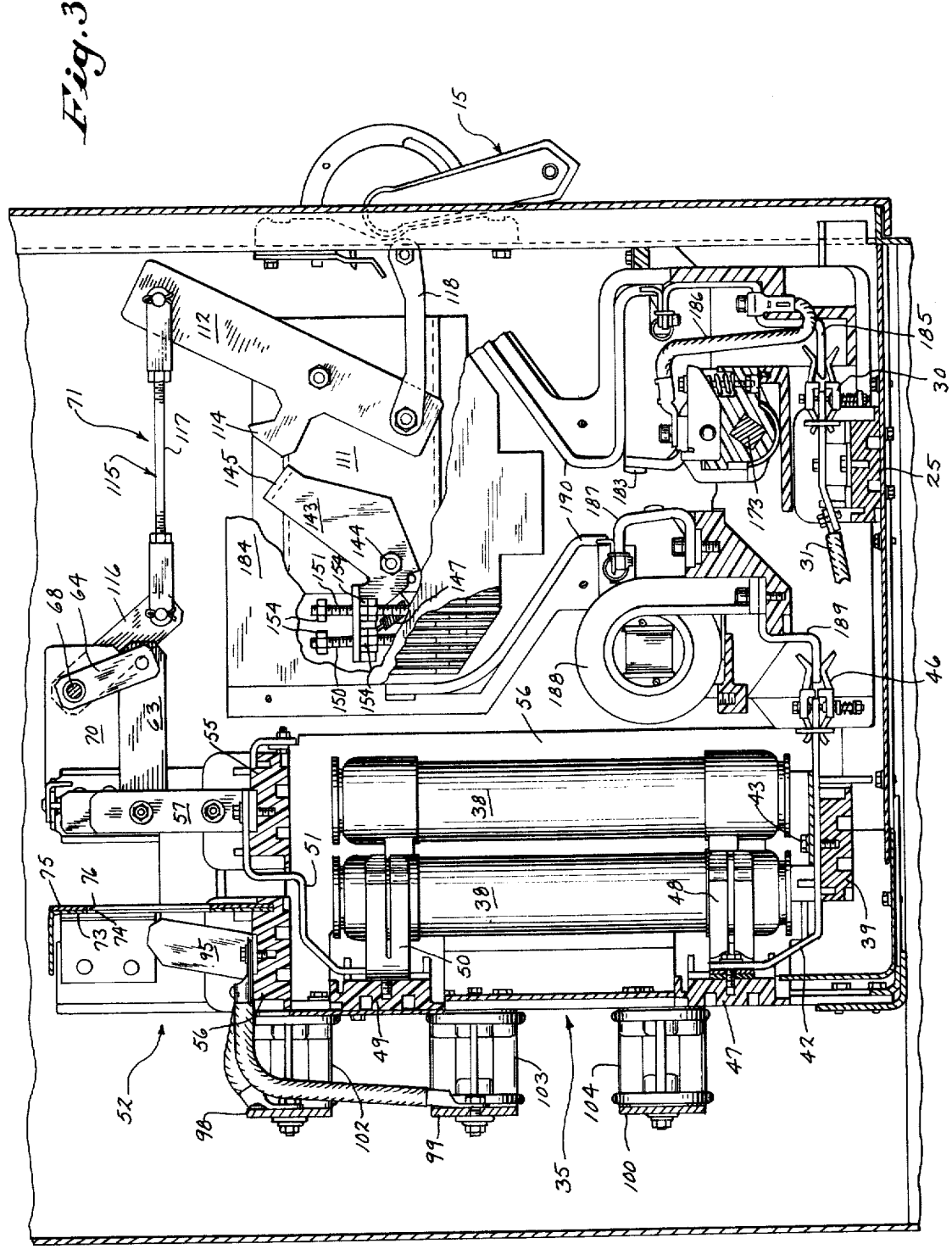
FIG. 3 is a view in cross section taken through the center compartment and carriage unit with parts cut away to show the interlock.

Referring to FIGS. 2 and 3, a fuse assembly 35 is mounted to the back wall of the compartment 6 immediately behind the output terminal support strip 25. The fuse assembly 35 is constructed primarily from molded glass polyester elements which provide good electrical insulation between three conductive paths which include double barrel fuses 36, 37 and 38. More specifically, the fuse assembly 35 is supported by a pair of upright, parallel steel members (not shown in the drawings) which extend the entire length of the enclosure 1 and which define a back wall for each compartment 5, 6 and 7. Brackets (not shown clearly in the drawings) extend forward from these support members, and the fuse assembly is fastened to them. A molded glass polyester input terminal support strip 39 connects between a pair of these brackets and defines the lower boundary of the fuse assembly 35. The support strip 39 includes upright walls 40 and 41 which divide it into three identical sections, and in each section, a fuse output bus bar 42 is fastened by a bolt 43. The bus bars 42 extend forward and fasten to respective power input terminal assemblies 44, 45 and 46. The power input terminals 44, 45 and 46 are identical in construction to the power output terminal assemblies 28, 29 and 30, and they provide a stab connection with the contactor when the carriage is in place.

Each fuse output bus bar 42 also extends rearward and upward where it fastens to a lower clip support strip 47 made from a molded glass polyester insulating materials which extends across the back of the compartment 6 between the upright support members. Rigidly fastened to the lower clip support 47 and in electrical connection with the fuse output bus bar 42 is a lower fuse clip 48 which wraps around and grips the rear barrel of one of the fuses 36, 37 or 38. Each clip 48 provides electrical connection with its associated fuse and, therefore, forms a part of the conductive path. Similarly, an upper clip support strip 49 made from a molded glass polyester insulating material extends across the back of the compartment 6 and connects between the upright support members. Upper fuse clips 50 fasten to the upper clip support 49 and extend around the upper end of the inner barrel of each of the fuses 36, 37 and 38 to hold them in place and to provide an electrical connection. The lower end of three fuse input bus bars 51 fasten to the respective upper fuse clips 50 at the clip support 49 and each extends upward to a disconnect assembly indicated generally at 52. Three conductive paths are thus formed through the respective fuses 36, 37 and 38, each including an input and output bus bar 51 and 42 and associated upper and lower fuse clips 50 and 48. To insure complete insulation of these conductive paths, upright walls 53 are provided on each side of the fuse assembly 35 and between the fuses 36, 37 and 38. The walls 53 are made of an insulating glass polyester such as that recited above, and they fit within aligned slots formed in the support strips 39, 47 and 49. Although double barrel fuses are shown and described herein, it should be apparent that single barrel fuses can also be accommodated.

Referring to FIGS. 2, 3, 5 and 7, the disconnect assembly 52 is located above the fuse assembly 35 and is supported by a pair of brackets 54 which extend forward from the two upright support members. The disconnect assembly 52 includes a forward disconnect support strip 55 which is identical in construction with the support strips discussed above, including upright portions which separate the strip into three sections, one for each of the three conductive paths. The forward disconnect support strip 55 is connected to the brackets 54 by bolts 66 and extends across the top of the fuse assembly 35. Disposed immediately to the rear of the support strip 55 and also extending laterally across the fuse assembly 35 is a rear disconnect support strip 56 which is connected to the brackets 54 by bolts 67. Each of the three sections of the forward disconnect support strip 55 is a connection point for one of the fuse input bus bars 51 which extends upward from the fuse assembly 35 and a pivotally connected knife contact 57 which forms part of a disconnect switch indicated generally at 58. Referring particularly to the center disconnect switch 58 shown in FIGS. 5 and 7, the fuse input bus bar 51 is secured to the forward disconnect support strip 55 along with an L-shaped member 59 by a bolt 60. The knife contact 57 is bifurcated to form two sections 57A and 57B which straddle the member 59 and which are rotatably connected thereto by a spring biased fastener 61. The knife contact 57 is operated by a link 63 which is rotatably fastened between the sections 57A and 57B by a second spring biased fastener 62. The link 63 connects approximately midway between the ends of the knife contact 57 and extends forward to rotatably connect with a rocker arm 64. The link 63 is made of a glass polyester insulating material and it is rotatably fastened to the metal rocker arm 64 by a fastener 65. As shown best in FIG. 2, the rocker arms 64 on each of the three disconnect switches 58 rigidly connects with a drive shaft 68 that extends laterally across the disconnect assembly 52 and is rotatably supported by brackets 69 and 70 which extend forward from the upright support members on the back wall of the enclosure 1. The drive shaft 68 extends through the right hand bracket 70 and connects with an interlock mechanism which is indicated generally as 71 and which will be described in more detail below.

Figure 5:
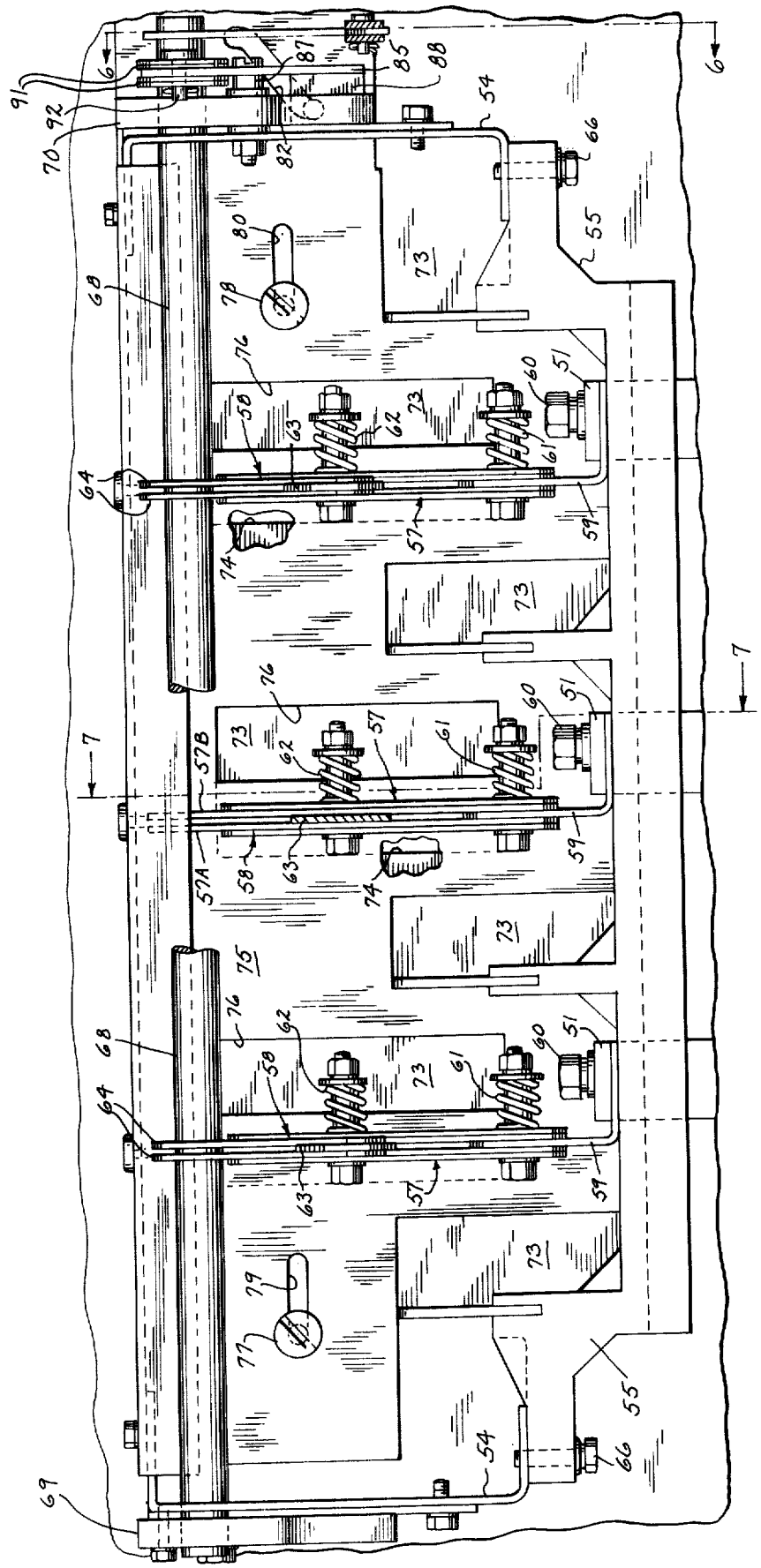
FIG. 5 is a front fragmentary view with parts cut away of the disconnect assembly.
Figure 6:
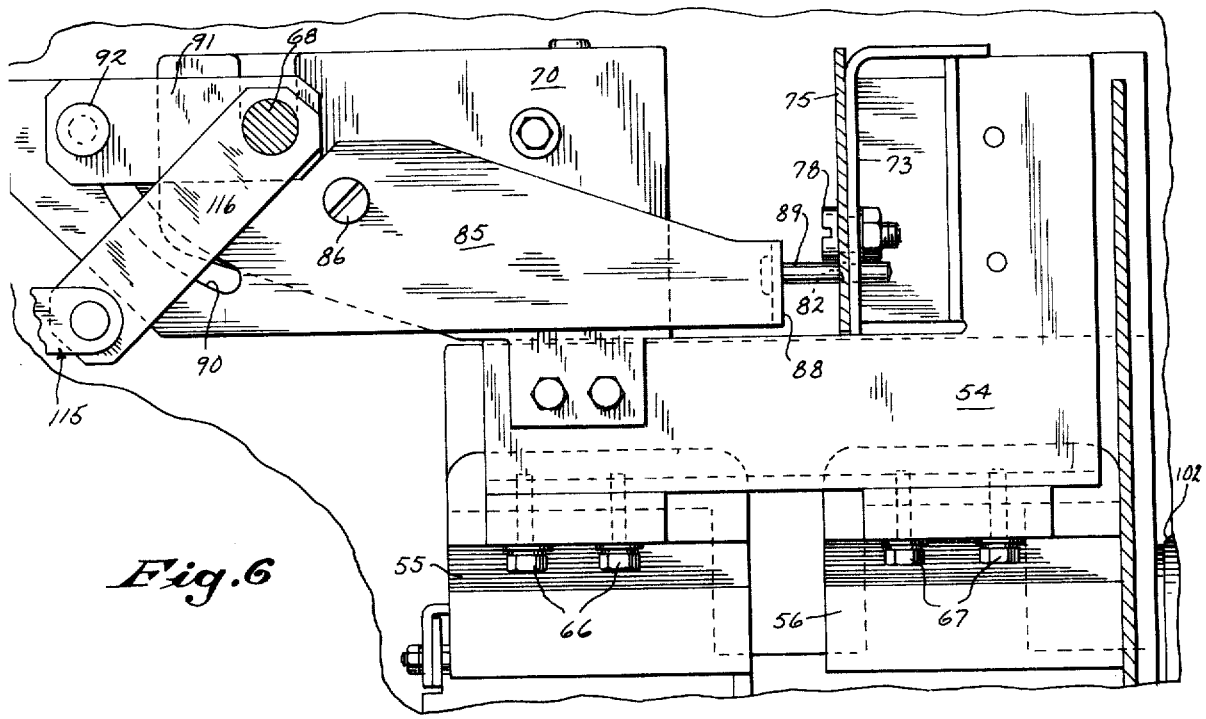
FIG. 6 is a side fragmentary view of the disconnect assembly.

Referring particularly to FIGS. 3, 5 and 6, the disconnect assembly 52 is divided into two sections by an insulating shield 73 which extends upward from the rear disconnect support strip 56 and which extends laterally across the entire width of the disconnect assembly 52. The shield 73 is made of a glass polyester insulating sheet material and it includes a set of three windows 74 which are aligned in the planes of the disconnect switches 58. Slidably connected to the front surface of the shield 73 is a shutter 75 which is also formed from a sheet of glass polyester insulating material and includes a set of three openings 76 which align with the windows 74 when the shutter is in its leftmost, or closed, position. The shutter 75 is slidably connected to the insulating shield 73 by fasteners 77 and 78 which are inserted through respective horizontal slots 79 and 80 formed in the shutter 75.

The shutter 75 is driven between its closed position and the open position shown in the drawings by a shutter mechanism 81 which connects to the right hand bracket 70 and is driven by the drive shaft 68. The shutter mechanism 81 includes a rocker plate 85 which is rotatably mounted to the outboard side of the bracket 70 by a nut and bolt fastener 86. A spacer 87 separates the plate 85 from the bracket 70 to allow free rotation. The rocker plate 85 narrows at its rear and is bent inboard to form a mounting surface 88 for a shutter drive pin 89. The shutter drive pin 89 extends rearward through an inclined slot 82 in the shutter 75 and through a vertical slot (not shown in the drawings) in the insulating shield 73. The rocker plate 85 also extends forward from the fastener 86 beneath the drive shaft 68 and an arcuate slot 90 is formed therein which is concentric with respect to the axis of the drive shaft 68. A two-part shutter drive link 91 securely fastens to the drive shaft 68 and extends forward on either side of the rocker plate 85 and a pin 92 extends through the arcuate slot 90 and connects to the forward end of the shutter drive link 91.

The shutter mechanism 81 is shown in its closed position in the drawings in which the shutter drive pin 89 is down and the shutter 75 is in its rightmost position. When the drive shaft 68 is rotated to close the disconnect switches 58, the shutter drive link 91 moves the pin 92 downward and rearward along the arcuate slot 90. when the pin 92 reaches the lower end of the arcuate slot 90 it bears against the rocker plate 85 driving its forward end downward and rotating it about the fastener 86. As a result, the mounting surface 88 and attached shutter drive pin 89 are raised and the shutter drive pin 89 rides upward in the shutter drive slot 82 causing the shutter 75 to move leftward to its open position. When the disconnect switches 58 are opened, the drive shaft 68 is rotated in the opposite direction and the shutter mechanism 81 operates in reverse to close the shutter immediately after the knife contacts 57 are clear. The arcuate slot 90 provides a delayed action of the shutter mechanism so that it is operated quickly when the knife contacts 57 clear the insulating shield 73 and shutter 75.

Figure 7:
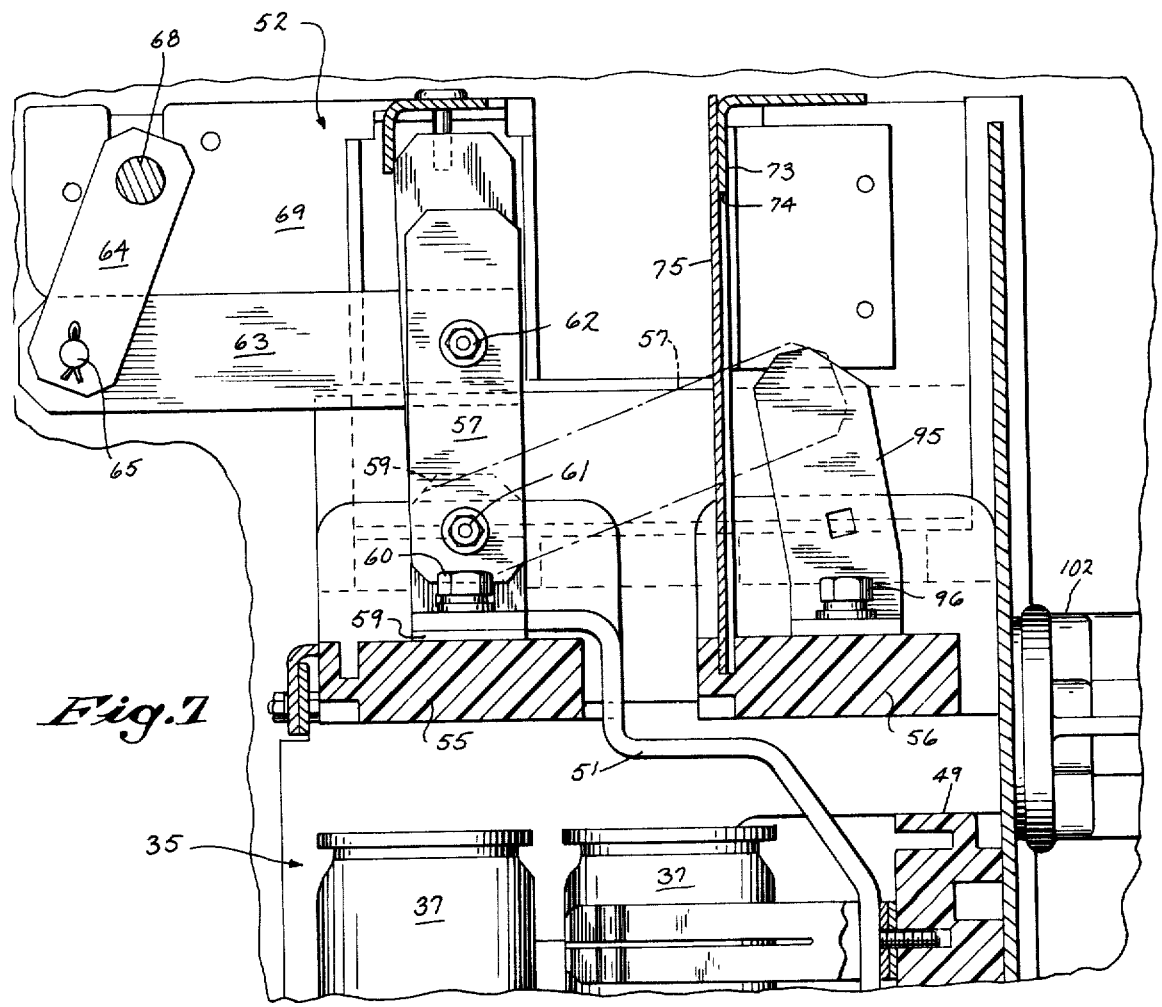
FIG. 7 is a view in cross section taken along the plane of the line 7—7 shown in FIG. 5.

Referring particularly to FIGS. 3 and 7, the disconnect assembly 52 also includes a set of three stationary contacts 95 which are disposed behind the insulating shield 73. The stationary contacts 95 are fastened to the rear disconnect support strip 56 by bolts 96 and they extend upward therefrom in the planes of the respective knife contacts 57. Each stationary contact 95 is made of a suitable metallic switch contact material and is positioned to receive the bifurcated outboard end of the knife contact 57 as it is rotated to its closed position shown in phantom lines in FIG. 6. The stationary contacts 95 have sufficient width to slightly separate the bifurcated ends of the knife contact 57 to thereby provide contact pressure which insures good electrical conduction. Each of the stationary contacts 95 is electrically connected to one of three high voltage bus bars 98, 99 and 100 which extend horizontally across the back wall of the enclosure 1 and are fastened thereto by insulators 102, 103 and 104. The disconnect assembly 52 is operated by rotating the drive shaft 68 between an open position in which the knife contacts 57 are forward of the insulating shield 73 in an upright position, and a closed position in which they extend rearward through the windows 74 and electrically connect with the stationary contacts 95. The spring biased fasteners 61 and 62 on each disconnect switch 58 are adjustable to allow free rotation of the knife contacts 57 with respect to both the link 63 and the L-shaped member 59 and to insure electrical connection with these members to provide a good conductive path for the high voltage current.

Figure 4:
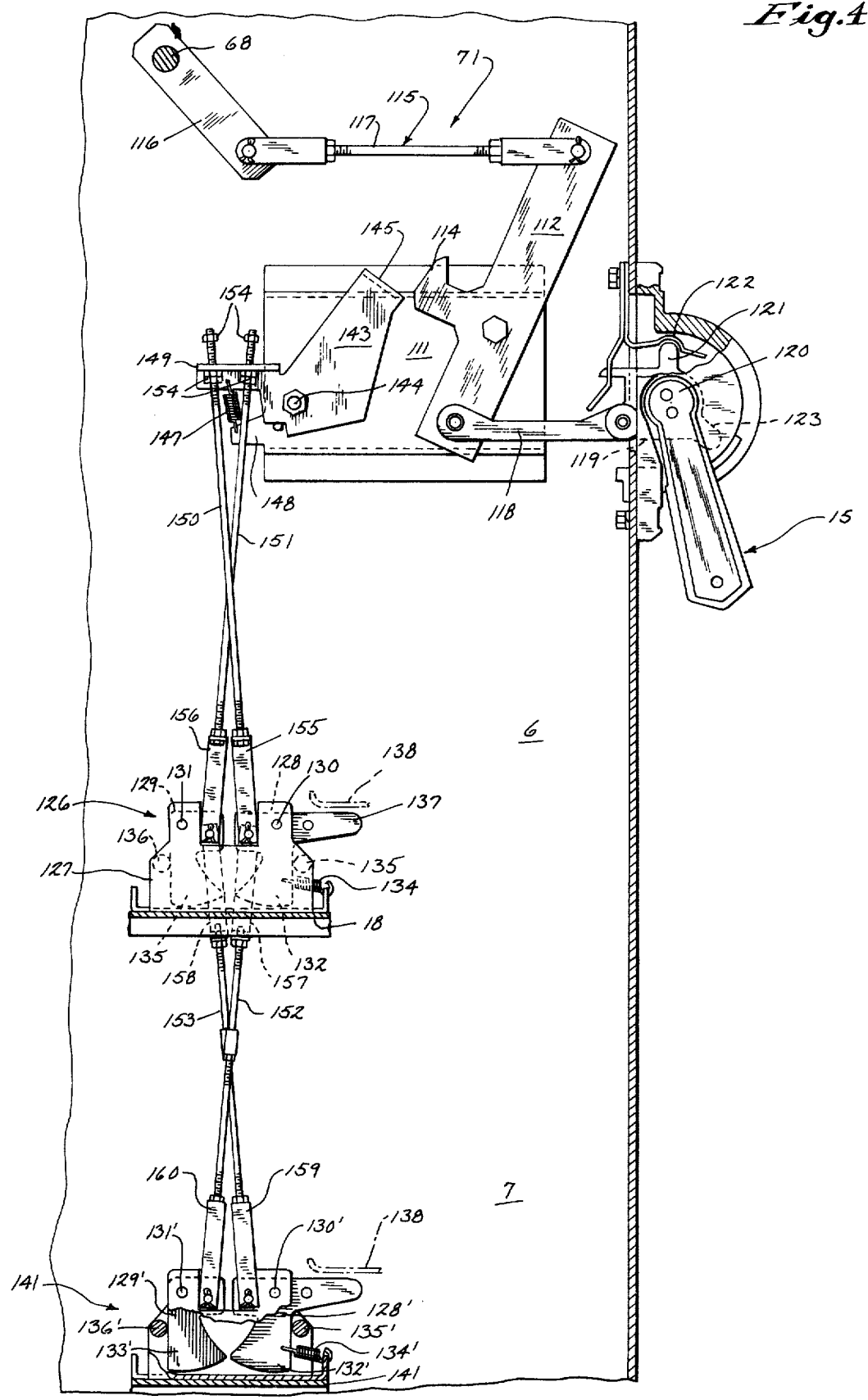
FIG. 4 is a fragmentary view showing the locking mechanism and the interlock.

The disconnect assembly 52 is operated by the interlock mechanism 71 which connects it to the handle 15 on the front of the enclosure 1. Referring particularly to FIGS. 2, 3 and 4, the interlock mechanism 71 is mounted to a right side wall 110 of the compartment 6 by a platform 111 which provides firm support and clearance between the wall 110 and the interlock mechanism 71. The interlock mechanism 71 includes a pivot arm 112 fastened to the platform 111 by a bolt 113 which is located intermediate its ends. The pivot arm 112 rotates in a vertical plane and includes an integrally formed hook 114 which extends rearward from the bolt 113 substantially perpendicular to the pivot arm 112. The upper end of the pivot arm 112 is rotatably connected to an upper drive link 115 which connects it to a crank arm 116 that firmly fastens to the right hand end of the disconnect assembly drive shaft 68. The upper drive link 115 pivots the crank arm 116 in response to rotational motion of the pivot arm 112 about the bolt 113 and it includes a threaded rod 117 which provides means of adjusting its length and, therefore, a means of precisely adjusting the relative position of the disconnect switches 58 with respect to the position of the pivot arm 112. The lower end of the pivot arm 112 is rotatably connected to a lower drive link 118 which in turn rotatably connects to a drive plate 119 which forms part of a handle mechanism mounted to the front of the enclosure 1. The drive plate 119 is rigidly fastened to the handle 15 and is rotatable about a handle axis 120 between an open position in which an integrally formed first lobe 121 engages a detent spring 122 and a closed position in which a second integrally formed lobe 123 engages the detent spring 122. The handle mechanism also includes a lock (not shown in the drawings) which allows the compartment door 12 to be opened only when the handle 15 is in the down, or open, position shown in the drawings.

The interlock mechanism 71 is freely operable between its opened and closed positions as long as neither contactor located in compartments 6 and 7 is energized. The disconnect switches 58 are intended to isolate the high voltage from the interior of the compartment 6 when the door 12 is to be opened. They are not, however, designed for interrupting high voltage current and would be rapidly destroyed if opened when conducting such current. Accordingly, means is provided for inhibiting the operation of the interlock mechanism 71 when either contactor is energized. Referring particularly to FIGS. 2 and 4, a first locking mechanism 126 is mounted to the floor 18 of the compartment 6, immediately outboard of the right hand support bracket 20 and beneath the platform 111. The first locking mechanism 126 includes a frame 127 to which is rotatably mounted a forward operating member 128 and a rear operating member 129. The forward and rear operating members 128 and 129 rotate in the same vertical plane about the respective axes 130 and 131 and they each include an opposing arcuate interference element 132 and 133, which extends downward and is enclosed by the frame 127. The forward operating member 128 is biased by a spring 134 against a forward stop 135 and the rear operating member rests against a rear stop 136. The interference elements 132 and 133 are shaped such that when the forward operating element 128 is rotated away from the forward stop 135, the rear operating element is inhibited from rotating away from the rear stop 136. Likewise, when the rear operating element 129 is rotated away from the rear stop 136, the forward operating element 128 cannot be rotated away from the forward stop 135. In other words, the operation of either element 128 or 129 inhibits the operation of the other.

The first locking mechanism 126 interacts with a contactor located in the compartment 6 through a lever arm 137 which is integrally formed on the forward operating member 128 and which extends forward therefrom to engage a locking lever 138 on the contactor. The connection of the locking lever 138 to the contactor will be described in detail hereinafter. When the contactor is energized, the locking lever 138 is depressed against the lever arm 137 to rotate the forward operating member 128 away from the forward stop 135, and when de-energized, the locking lever 138 lifts upward to allow the bias spring 134 to pull the forward operating member 128 forward against the stop 135.

A second locking mechanism 140 is mounted to the floor 141 of the compartment 7 directly beneath the first locking mechanism 126. The construction of the second locking mechanism 140 is identical to that of the first locking mechanism 126 and the elements thereof are identified with like reference numbers primed. The lever arm 137' on the second locking mechanism 140 interacts in a similar manner with the locking lever 138 on a contactor located in the compartment 7.

The first and second locking mechanisms 126 and 140 are interconnected with the interlock mechanism 71 to prevent its operation when either contactor is energized. More specifically, an interlock arm 143 is fastened to the platform 111 by a bolt 144 and is positioned immediately to the rear of the pivot arm 112 where it is rotatable about the bolt 144 between a locked position in which a bearing plate 145 integrally formed on its forward end engages the hook 114 and an unlocked position in which the hook 114 clears the bearing plate 145. The interlock arm 143 also includes an integrally formed appendage 146 which extends rearward from the bolt 144. A bias spring 147 connects between the appendage 146 and an ear 148 on the platform 111 to bias the interlock arm 143 in its unlocked position shown in the drawings. Integrally formed to the appendage 146 is a horizontal fastening plate 149. The fastening plate 149 is linked with both the forward operating member 128 and the rear operating member 129 on the upper locking mechanism 126 by a pair of adjustable connecting rods 150 and 151, respectively. In addition, the upper locking mechanism 26 is coupled to the lower locking mechanism 140 through a similar pair of adjustable connecting rods 152 and 153 which connect the lower end of the connecting rod 150 to the rear operating member 129' and the lower end of the connecting rod 151 to the forward operating member 128', respectively. The ends of each of the connecting rods 150-153 are threaded and the upper ends of the rods 150 and 151 are loosely retained to the fastening plate 149 by bolts 154. The lower ends of the connecting rods 150 and 151 include connecting plates 155 and 156 which rotatably connect with the operating members 128 and 129 on the locking mechanism 126. Similar connecting plates 157 and 158 on the upper ends of the rods 152 and 153 and connecting plates 159 and 160 on their lower ends, provide an adjustable connection with the locking mechanism 126 and 141.

When either lever arm 137 or 137' is depressed by its associated energized contactor, the connecting rods act to raise the fastening plate 149 and thereby rotate the interlock arm 143 into its locked position in which the interlock mechanism 71 is immobilized. In addition to preventing the disconnect switches 58 from being opened when either contactor is energized, the mechanism prevents the handle 15 from being operated and thus prevents the compartment door 12 from being opened. In the arrangement shown, the door 13 on the lower compartment 7 is tied to the door 12 by a metal strip (not shown in the drawings) which prevents it from being opened separately. Finally, because the operation of the forward and rear operating members 128 and 129 in the locking mechanism 126 and the forward and rear operating members 128' and 129' in the locking mechanism 141 are mutually exclusive, neither contactor may be energized when the other is energized. For example, if the contactor in compartment 7 is energized, its locking lever 138 depresses the lever arm 137' on the locking mechanism 141 and the connecting rods 153 and 151 are pushed upward. As a result, not only is the interlock mechanism 71 inhibited by the interlock arm 143, but the rear operating member 129 on the locking mechanism 126 is operated to swing forward and inhibit rotation of the forward operating element 128. The locking lever 138 on the contactor in compartment 6 cannot be depressed, and as will become apparent from the discussion which follows, the contactor cannot therefore be energized. It should be apparent to those skilled in the art that on the one hand additional contactors can be interconnected and operated in the manner taught by the present invention, or on the other hand, the invention may be applied to a single contactor by eliminating the interlock mechanism 141 and associated connecting rods.

Figure 9:
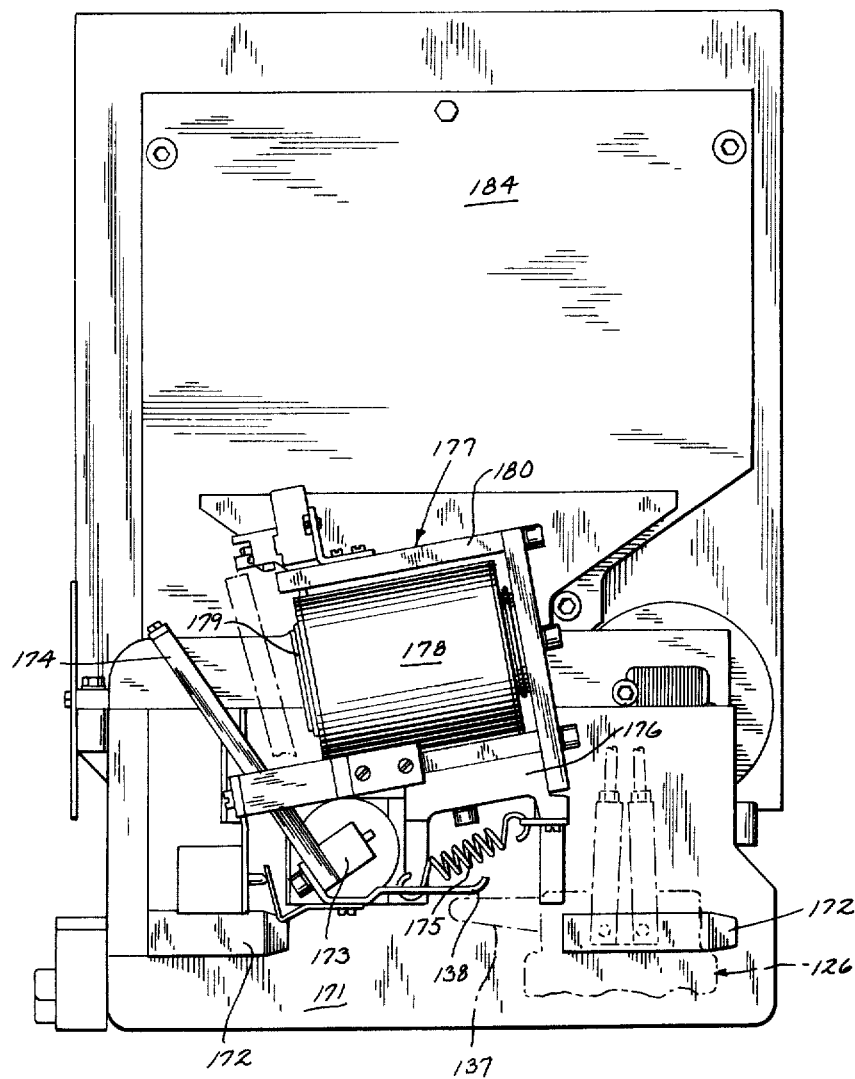
FIG. 9 is a side elevation view of the carriage unit.
Figure 8:
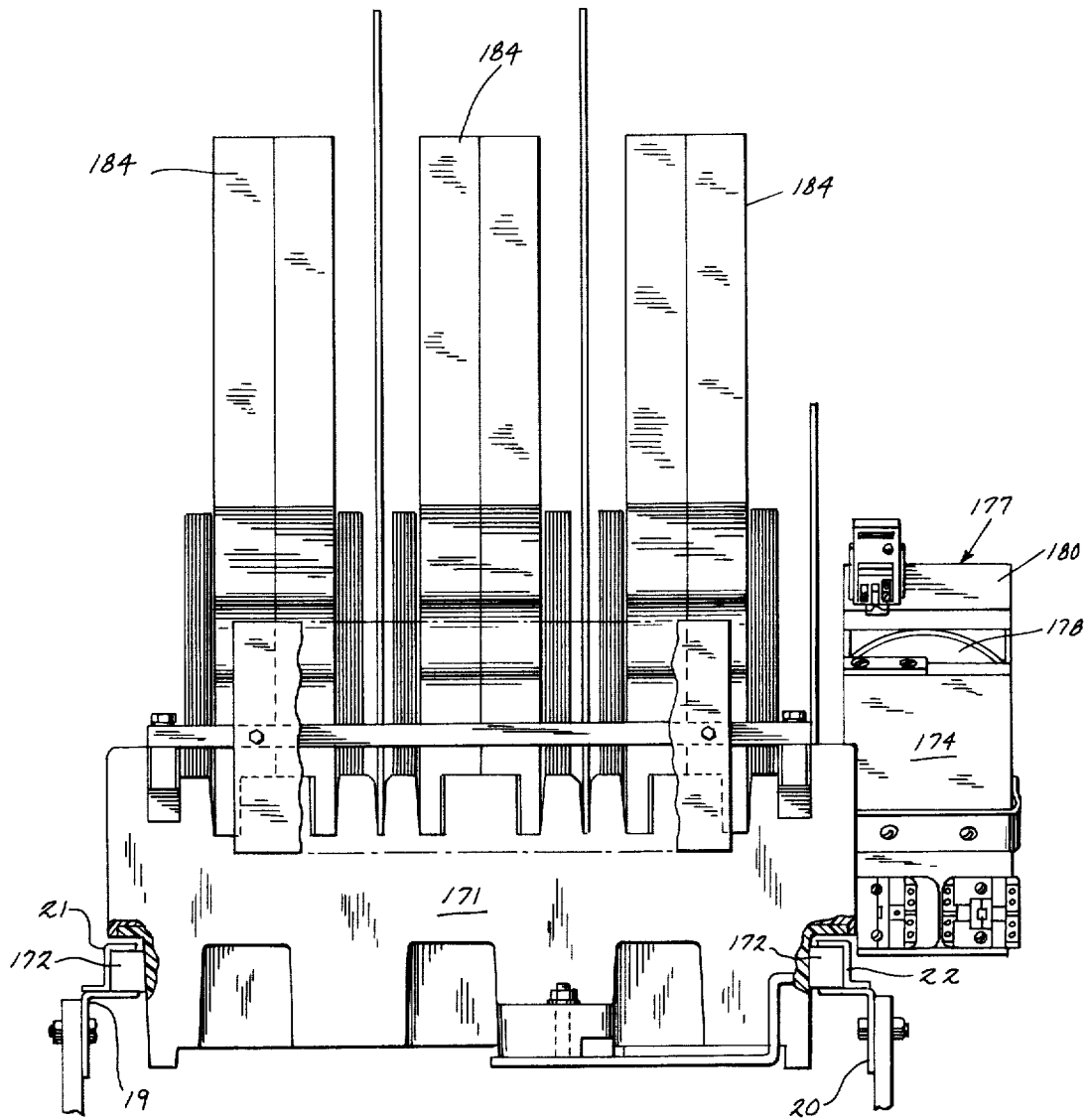
FIG. 8 is a front elevation view of the carriage unit.

Referring to FIGS. 3, 8 and 9, the contactor which is inserted into the compartments 5, 6 or 7 is supported by a carriage structure 170. The carriage 170 includes a base 171 made from a molded glass polyester such as that recited above, which has a pair of guides 172 molded to each of its sides near its front and rear corners. when the carriage 170 is inserted into a compartment, the guides 172 fit within the guideways 23 and 24 and the carriage structure 170 slides rearward towards the fuse assembly 35 into an operating position in which it electrically connects with the high voltage input terminals 44-46 and the high voltage output terminals 28-31. Extending laterally through the base 171 and rotatably supported thereby is an operating shaft 173 which connects with an armature plate 174 located on the right hand side of the carriage structure 170. The locking lever 138 discussed above is also securely fastened to the operating shaft 173 and it extends rearward therefrom in the plane of the armature plate 174. A contactor bias spring 175 connects between the locking lever 138 and a bracket 176 on the base 171 to raise the locking lever 138 and thereby bias the operating shaft 173 in a deenergized, or open position. A magnet assembly 177 is mounted to the base 171 above the operating shaft 173 and immediately to the rear of the armature plate 174. The magnet assembly includes a coil 178 which is wound around a magnetic core 179 and surrounded by a U-shaped magnetic circuit 180. When energized, the coil generates a magnetic field which attracts the armature plate 174 from its deenergized position to a position adjacent the face of the core 179, which in turn rotates the operating shaft 173 and pivots the locking lever 138 downward to operate the locking mechanism as previously described.

Referring particularly to FIGS. 3 and 8, a set of three movable contacts 183 are carried by the operating shaft 173 and are equally spaced along its length, beneath three arc shutes 184 mounted on the base 171. Referring particularly to FIG. 3, each movable contact 183 is electrically connected to a power output stab 185 through a flexible connector 186. Each stab 185 is rigidly fastened to the carriage base 171 and it extends rearward through an opening therein to engage and connect with one of the output terminal assemblies 28, 29 or 30. Associated with each movable contact 183 is a stationary contact 187 which is mounted on the carriage base 171 immediately to the rear. Each stationary contact 187 is electrically connected to one end of a blowout coil 188 and the other end of each blowout coil 188 connects to a power input stab 189. Each input stab 189 extends through an opening in the rear of the carriage base 171 to connect with one of the power input terminal assemblies 44, 45 or 46.

As is well known in the art, means must be provided to extinguish the arcs which are generated when the contacts are opened. To accomplish this, a pair of current conductors 190 are positioned immediately above the gap between each pair of contacts 83 and 87, and these conductors 190 extend outward and upward into an associated arc shute 184. When the contactor is deenergized, the operating shaft 173 rotates the movable contact 183 out of engagement with the stationary contact 187 and an arc is generated. The magnetic field created by the blowout coil 188 drives this arc upward, away from the contacts and between the current conductors 190. It is driven into the arc shute 184 where it is lengthened, cooled and finally extinguished. Although an air-break, electromagnetically-operated, clapper-type contactor is described herein, it should be apparent to those skilled in the art that the present invention is also applicable when other types of carriage mounted contactors are used.

The simplicity of the invented structure described herein not only lowers the cost of both production and maintenance, but it also increases the reliability of the system. Also, the flexibility, simplicity and adjustability of the invented arrangement makes the system particularly suited for efficient mass production assembly techniques. For example, the interlock mechanism 71 and the associated locking mechanisms 126 and 140 are particularly easy to assemble and adjust in spite of relatively large differences in compartment sizes and shapes normally encountered during production. And finally, the invented structure makes use of a minimal number of parts, both in terms of the total number and in terms of the total number of different types. For example, the support strips 25, 39, 47, 49, 55 and 56 are all formed from the same mold, and the locking mechanisms 126 and 141 and associated connecting rods 150–153 are identical.

We claim:

1. In a high voltage motor control the combination comprising an enclosure having a door and a handle which is operable between a locked and unlocked position allow entry into the enclosure through the door;

a plurality of current conducting paths contained within said enclosure conducting load current between a set of high voltage terminals on the back of said enclosure and a set of load lines;

guide means mounted to the enclosure floor;

a carriage which is slidably received by said guide means and retained thereby in an operating position, said carriage including a contactor which is electrically connected into said current conducting paths when said carriage is in said operating position, said contactor being operable to conduct load current when energized and to interrupt conduction of load current when deenergized;

a fuse assembly mounted to the back wall of said enclosure and including a set of fuses which are electrically connected into said current conducting paths;

a disconnect assembly mounted to the back wall of said enclosure above said fuse assembly and including a set of disconnect switches which are electrically connected into said current conducting paths and which are operable between a closed position in which they conduct load current from said high voltage terminals on the back of said enclosure and an open position in which they isolate the high voltage terminals from the interior of the enclosure; and an interlock mechanism which connects said disconnect assembly to said handle and which is operable to open said disconnect switches when said handle is operated to unlock said door.

2. The high voltage motor control as recited in claim 1 in which said disconnect assembly includes an insulating shield interposed between said high voltage terminals and the interior of said enclosure, said insulating shield having a set of windows, one associated with each of said disconnect switches, and wherein each disconnect switch includes a movable contact disposed on one side of said insulating shield within said enclosure and a stationary contact disposed on the other side of said insulating shield and electrically connected to said high voltage terminals, each of said movable contacts being coupled to said interlock mechanism for operation between said closed position in which they extend through the windows in said insulating shield to electrically contact their associated stationary contact and said open position in which they are withdrawn into said enclosure.

3. The high voltage motor control as recited in claim 2 in which said disconnect assembly includes a slidably mounted shutter having openings which align with the windows in said insulating shield when in a closed position, said shutter being coupled to said interlock mechanism by a shutter mechanism which slides said shutter to an open position in which it covers said windows to isolate said high voltage terminals from the interior of said enclosure when said disconnect switches are opened.

4. The high voltage motor control as recited in claim 3 in which said disconnect switch movable contacts and said shutter mechanism are coupled to said interlock mechanism by a common drive shaft which is rotatably mounted to the disconnect assembly.

5. The high voltage motor control as recited in claim 1 in which said interlock mechanism is coupled to said contactor by a locking mechanism which is operable to inhibit operation of said interlock mechanism when said contactor is energized.

6. In a high voltage motor control the combination comprising an enclosure having a door and a handle which is operable between a locked and unlocked position to allow entry into the enclosure through the door;

a set of high voltage terminals on the back of said enclosure;

a disconnect assembly mounted to the back wall of said enclosure and connected to said high voltage terminals, said disconnect assembly being operable between a closed position in which it conducts high voltage to the interior of said enclosure and an open position in which it isolates said high voltage terminals from the interior of said enclosure;

an interlock mechanism mounted to one side of said enclosure and connected with said enclosure handle and said disconnect assembly, said interlock mechanism being operable in response to the position of said handle to close said disconnect assembly when said handle is in its locked position and to open said disconnect assembly when said handle is in its unlocked position;

a contactor removably mounted on the floor of said enclosure and electrically connected to said disconnect assembly and receiving high voltage at a set of input terminals, said contactor being operable to conduct said received high voltage to a set of output terminals when in an energized state and being operable to interrupt such conduction when in a deenergized state; and a locking mechanism coupled to said contactor and said interlock mechanism, said locking mechanism being operable to inhibit operation of said interlock mechanism when said contactor is energized.

7. The high voltage control as recited in claim 6 in which said interlock mechanism includes a rotatably mounted pivot arm which is linked to said handle and is rotated when said handle is operated, and said locking mechanism is coupled to said interlock mechanism by a rotatably mounted interlock arm which engages and locks said pivot arm when said contactor is energized.

8. The high voltage motor control as recited in claim 7 in which said locking mechanism is mounted to the floor of said enclosure alongside said contactor and it includes a forward rotatable operating member which is coupled to the interlock arm by a connecting rod, and in which said contactor includes an operating shaft which rotates when the contactor is energized to rotate said forward operating member.

9. The high voltage motor control as recited in claim 8 in which a second contactor is mounted in said enclosure and a second locking mechanism is mounted alongside it and coupled to the contactor operating shaft by a forward operating member, said first locking mechanism including a rear operating member which is coupled to the forward operating member of said second locking mechanism by a second connecting rod and to said interlock arm by a third connecting rod, and said second locking mechanism includes a rear operating member which is coupled to the forward operating member of said first locking mechanism by a fourth connecting rod, wherein the operation of said forward and rear operating members on said first and second locking mechanisms are mutually exclusive to prevent both contactors from being energized at the same time.

* * * * *